Jan. 8, 1929.  
C. A. CAMPBELL  
1,698,359  
VACUUM BRAKE  
Filed March 22, 1928
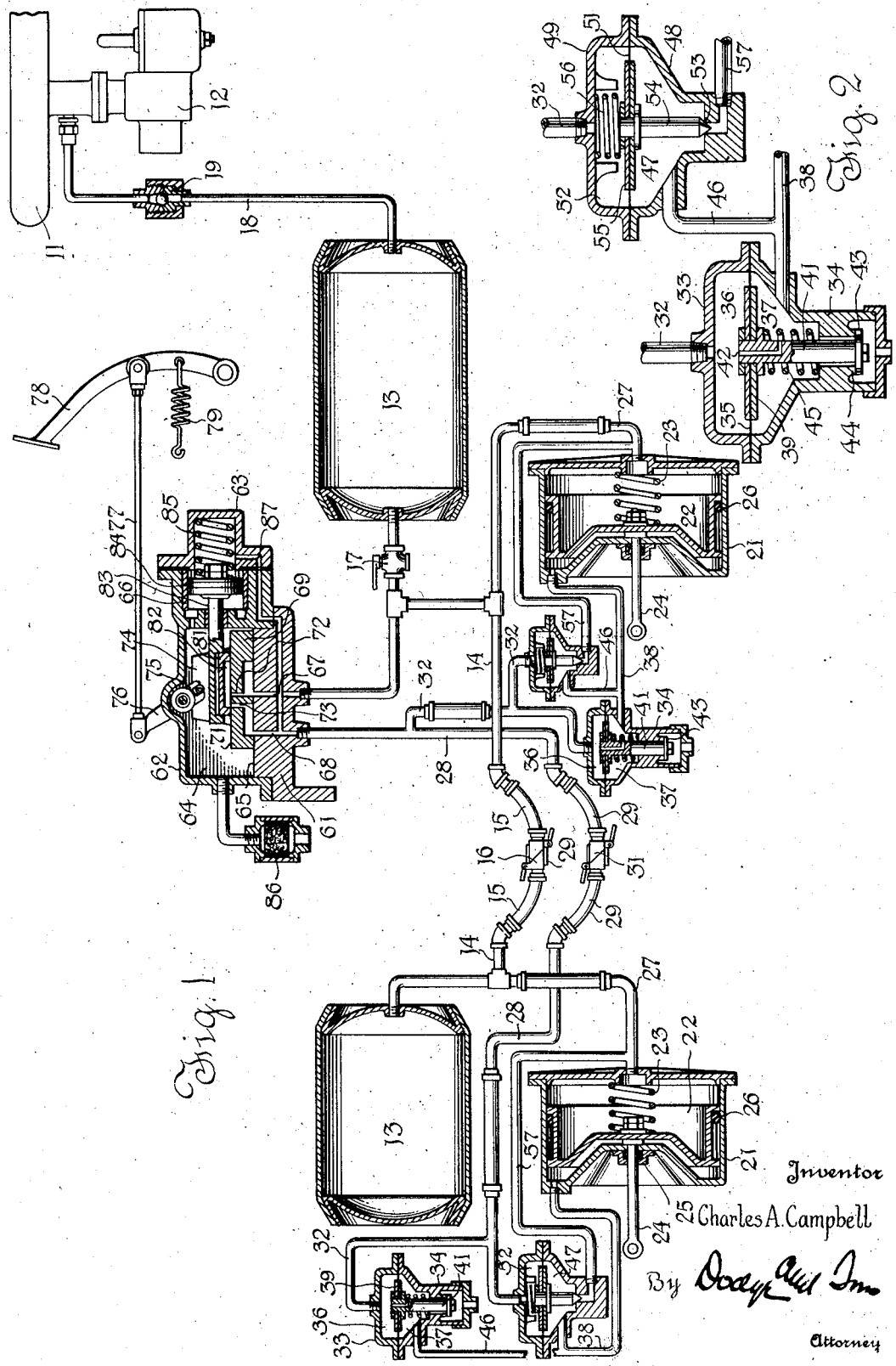
Inventor  
Charles A. Campbell  
By Dodge...  
Attorney Patented Jan. 8, 1929.

1,698,359

UNITED STATES PATENT OFFICE.

CHARLES A. CAMPBELL, OF WATERTOWN, NEW YORK, ASSIGNOR TO THE NEW YORK AIR BRAKE COMPANY, A CORPORATION OF NEW JERSEY.

VACUUM BRAKE.

Application filed March 22, 1928. Serial No. 263,937.

This invention relates to fluid pressure brakes and particularly to brakes operating at sub-atmospheric pressure and commonly known as "vacuum" brakes.

Generally stated, such a system includes some means for establishing sub-atmospheric pressure, a brake cylinder having a piston, one side of which is subject to a substantially constant pressure (it may be atmospheric or it may be the sub-atmospheric pressure above mentioned) and a brake valve which is operated to establish against the other side of the piston an opposing pressure which varies under control of the brake valve between atmospheric pressure and the sub-atmospheric pressure above mentioned.

For an example of such a brake system, reference may be made to my prior Patent No. 1,653,985, granted December 27, 1927, which will be used for illustrative purposes in connection with the present invention.

Brakes of the vacuum type have been used to some extent on railway trains and are now coming into more or less extensive use on motor vehicles because it is conveniently possible to secure the necessary sub-atmospheric pressure by the use of a direct connection to the intake manifold of an internal combustion engine.

Brakes of this type have been used for trains of vehicles consisting of a motor truck and one or more trailers, and where this practice is followed there is apt to be some lag in the application of the brakes at the rear of the train of vehicles. On a single vehicle if the connecting pipes are small, and it is sometimes desirable to make them small to economize in the volume of air handled, there will be an undesirable lag in the application and release of the brakes.

The present invention relates to an accelerating valve to correct this defect. An accelerating valve is applied to each cylinder and is actuated by flow in the reverse directions between the brake valve and the brake cylinder. Generally stated, this flow is slightly throttled so as to produce a pressure differential on opposite sides of the throttling constriction, which differential increases with the rate of flow. With this throttling constriction is associated a diaphragm mechanism which may conveniently consist of two separate diaphragms, each diaphragm subject on its opposite side to the pressure on opposite sides of the constriction. One of these diaphragms is connected to operate a valve which admits atmospheric air when air is flowing from the brake valve to the brake cylinder. The other diaphragm operates a reversely arranged valve which upon flow from the brake cylinder to the brake valve, opens to establish a connection from the brake cylinder to the means for establishing sub-atmospheric pressure, such connection being additional to and entirely independent of the connection which passes through the brake valve.

The invention will now be explained as applied to the brake mechanism described and claimed in my prior patent above identified.

In the accompanying drawings,—

Fig. 1 is a diagrammatic section of the brake system of my prior patent, showing the accelerating mechanism applied.

Fig. 2 is an enlarged sectional view of the accelerating mechanism.

11 represents the intake manifold and 12 the carbureter of an internal combustion engine of that type which draws in its fuel charges by suction, for example, an ordinary four-cycle gasoline engine. It is well known that the absolute pressure in the intake of such an engine falls as much as 24 inches of mercury below atmospheric pressure.

13, 13, are sub-atmospheric pressure reservoirs, the first on the motor vehicle proper and the second on a trailing vehicle, which is here assumed to be connected to the motor vehicle. The two reservoirs 13, 13 are connected together by a so-called vacuum pipe 14 which is coupled between the motor vehicle and the trailer in a familiar manner by flexible hose 15 and separable couplings 16. The couplings 16 may be of any suitable type, for example, those described in my prior patent. 17 is a stop cock for shutting off the air brake system on occasion.

The reservoir 13 on the motor vehicle is connected by a pipe 18 with the intake manifold 11, and a check valve 19 is interposed in the pipe 18 to permit flow from the reservoir to the manifold and to preclude back flow.

The motor vehicle and the trailer are each provided with brake cylinders 21, 21, which have pistons 22, urged in a brake-releasing direction by springs 23. Connected to each piston is a piston rod 24 which passes through a stuffing box 25 in the cylinder head. It will be observed that the pistons are double-acting. They are sealed by rolling packing rings 26. The head end of each brake cylinder 21 is permanently connected by a branch 27 with the vacuum line 14. It follows, therefore, that when the motor is operating the two reservoirs 13, and the head ends of the two cylinders 21 are maintained at subatmospheric pressure at all times. If the trailer is disconnected the automatic means on coupling 16, described in my prior patent, seals the vacuum pipe 14 on the motor vehicle.

On the motor vehicle and trailer there is also a brake pipe 28 which is connected between the motor and the trailer by a flexible hose 29 and detachable couplings 31, which may be of any suitable type, and which preferably are of the type described in my prior patent. The brake pipe 28 on the motor vehicle and on the trailer is connected to both ends of the cylinders 21 through an accelerating mechanism. A branch 32 leads to a housing made up of a top portion 33 and a bottom portion 34 which are clamped together to confine a flexible diaphragm 35. The branch 32 leads to the space 36 above the diaphragm. The space 37 below the diaphragm is connected by branch pipe 38 to that end of cylinder 21 opposite to the connection 27. The diaphragm 35 carries clamped to its center a plate structure 39 to which is attached to rod 41. Leading through the rod 41 is a restricted by-pass port 42 which connects the spaces 36 and 37. The rod 41 carries at its lower end a valve member 43 which coacts with seat 44 to control the entrance of atmospheric air to the space 37. A spring 45 surrounding the rod urges this upward, that is, in a direction to close the valve 43 against the seat 44. Thus air flowing by way of connection 32, chamber 36, port 42, chamber 37 and connection 38, to the left hand end of the brake cylinder 21, is throttled at 42, and a differential pressure acts upon the diaphragm 35 to move this downward in said valve 43 and thus permit atmospheric air additional to that flowing through the connection 32, to flow by way of connection 38 to the left end of the brake cylinder 21.

Flow in the reverse direction merely causes the diaphragm 35 to seat the valve 43 more tightly.

The diaphragm and valve mechanism just described is that which accelerates application of the brake. Associated with it is a mechanism for accelerating release. Leading from the space 37 by way of connection 38 is a branch connection 46 which enters the lower chamber 47 within the housing made up of separable parts 48 and 49. These clamp between them a flexible diaphragm 51 which divides the space within the housing into two chambers, the lower one, 47, just mentioned, and the upper one, 52. The upper chamber 52 is connected to the branch 32 and the lower chamber contains a valve seat 53 with which coacts a valve 54 carried on a center plate structure 55 clamped to the center of diaphragm 51. A spring 56 urges plate 55 down and consequently tends to seat the valve 54. The valve 54 and the seat 53 control flow through a connection 57 which leads to the connection 27 and hence to the right hand end of the brake cylinder 21.

When during release air is flowing from the left hand end of cylinder 21, it must pass through the restricted port 42 and the pressure in connection 38 and its related branch 46 is therefore somewhat higher than the pressure in branch 32. As explained this causes diaphragm 35 to seat the valve 43 more tightly. At the same time its effect on the diaphragm 51 is such as to unseat the valve 54. The effect is to connect the two ends of the cylinder 21 by way of connection 57, chamber 47, branch 46, connection 38. In other words the pressures in the two ends of the cylinder are rapidly equalized, or, to view the matter from a slightly different point of view, the effect is to establish a direct connection from the left hand end of cylinder 21 to the vacuum pipe 14. The same accelerating mechanism is applied to the brake cylinder of the trailer in identically the same way and the mechanism on the trailer is given the same reference numerals.

Any brake mechanism might be used to establish in the brake pipe 28 a pressure which varies under the control of the brake valve between atmospheric pressure and the subatmospheric pressure characteristic of the reservoirs 13, but I shall describe the brake valve of my prior patent for illustrative purposes.

The housing of the brake valve is made up of two major portions 61 and 62 and a cap portion 63. These enclose a valve chamber 64 in which is a valve seat 65 and in communication with the chamber 64 is a cylinder having a cylinder bushing 66. In the valve seat 65 are two ports, the first of which, 67, communicates with the vacuum pipe 14, and the second of which, 68, communicates with the brake pipe 28.

Slidable on the valve seat 65 is a member 69 which is in effect a shiftable valve seat. It has on its upper face a valve seat portion 71 into which open two small ports 72 and 73 which serve as continuations of the ports 67 and 68 with which, respectively, the ports 72 and 73 are in communication in all positions of the shiftable valve seat 69. This result is secured by enlarging the lower portions of the ports 72 and 73, as shown. The shiftable valve seat member has an upward extension 74 which carries a roller 75 engaged by the slotted end of the pivoted lever 76.

The lever 76 is connected by a reach rod 77 with a foot lever 78, which is the operating brake lever of the device. This is held in its normal or release position by a tension spring 79. Sliding on the top of the shiftable valve seat 69 is a valve 81 having a recess 82 in its lower face. This valve is confined in a notch in a piston rod 83 which is connected to a piston 84 sliding in the cylinder bushing 66. A spring 85 urges the piston 84 to the left. The space within the valve chamber 64 is constantly open to atmosphere through a strainer 86, from which it follows that the left hand side of the piston 84 is subject to atmospheric pressure, it being recalled that there is a direct communication from the chamber 64 to the left hand end of the cylinder space within bushing 66. The right hand end of the cylinder space within the bushing is connected by a port 87 with the port 68 and consequently with the brake pipe 28.

In the normal or release position of the device, shown in Fig. 1, the piston 84 is in its extreme right hand position and the recess 82 in the valve 81 connects the ports 72 and 73. It follows therefore that both ends of the cylinder 21 are at sub-atmospheric pressure, i. e., at the pressure in reservoir 13. Thus the space to the right of the piston 84 is at this same sub-atmospheric pressure. If the brake lever 78 be swung to the right, the valve seat member 69 is moved to the left, and when the port 73 moves beyond the end of valve 81, atmospheric air entering through strainer 86 will flow through the ports 73 and 68 to the brake pipe. This air will flow to the left hand end of the brake cylinder 21, applying the brake. At the same time the valve 43 will be unseated allowing an additional flow of atmospheric air to the left hand side of the cylinder 21. This will result in a gradual increase of pressure in the pipe 28 which, acting on the right hand side of piston 84, and assisted by the action of the spring 85, will move the valve 81 far enough to the left to blank the port 73, at which time motion will cease.

Movement of the lever 78 to the left will cause the valve seat 69 to move to the right. As soon as port 82 bridges the ports 72 and 73 the brake pipe will be again connected with reservoir 13. This starts back flow through the brake pipe 28 which unseats the valve 54. It follows, therefore, that the pressure in the left hand end of cylinder 21 is reduced first by flow through the brake valve and second by equalizing flow to the other end of the cylinder through the valve 54. As above suggested this equalizing flow is in effect a flow through a secondary path, independent of the brake valve, to the reservoir 13.

It will be apparent from a brief study of the action of the brake valve that for each position of the brake lever 78 there is a corresponding pressure in the left hand end of the cylinder 21, so that the pressure with which the brakes are applied may be graduated merely by changing the position of the lever 78. The action of the valves 43 and 54 does not disturb this graduating action because obviously neither of these valves opens except when there is a flow toward or from the brake cylinder in excess of the capacity of the port 42. Consequently as the pressure in the left hand end of the cylinder 21 approaches the value corresponding to the position of brake lever 78, the valve 43 or 54, whichever may at that time be open, will close. This leaves the final determination of brake pressure under the exclusive control of the brake valve.

While I show the invention as applied to a double-acting brake cylinder in which both ends of the cylinders are at sub-atmospheric pressure, other types of vacuum brake are known and the invention is not limited to the particular type illustrated. It may be used effectively with any type of vacuum brake in which a brake valve operates to establish in the brake cylinder a varying sub-atmospheric pressure. Consequently various departures from the specific embodiment illustrated are possible and are contemplated.

For example, while I show two distinct diaphragms and two distinct housings, one accelerating application and the other accelerating release, this is merely a matter of convenience. The mechanism might otherwise be arranged and still embody the characteristic flow throttling orifice and a diaphragm mechanism responsive to differential pressures on the two sides of the orifice, and effective when the differential acts in one direction, to admit atmospheric air, and when it acts in the other direction, to establish an independent suction connection.

What is claimed is,—

1. In a brake system, the combination of a brake cylinder; means for creating sub-atmospheric pressure; a brake valve interposed between said means and said brake cylinder and operable to establish in said cylinder by flow to and from the same a pressure which varies between atmospheric pressure and the sub-atmospheric pressure created by said means; means for throttling flow between said brake valve and said cylinder in both directions; and valve means responsive to the differentials of the pressures on opposite sides of such throttling means and serving on flow toward the cylinder to admit atmospheric air to the cylinder independently of the brake valve and on flow from the cylinder to connect the brake cylinder with said sub-atmospheric pressure producing means independently of the brake valve.

2. In a brake system, the combination of a brake cylinder; means for creating sub-atmospheric pressure; a brake valve interposed between said means and said brake cylinder and operable to establish in said cylinder by flow to and from the cylinder a pressure which varies between atmospheric pressure and the sub-atmospheric pressure created by said means; means for throttling flow between said brake valve and said cylinder in both directions; motor means responsive to differentials of the pressures on opposite sides of said throttling means; and dual valve means controlled by said motor means and arranged to be closed thereby when said differential is zero, and opened selectively when one pressure predominates to admit atmospheric air to the brake cylinder independently of flow through the brake valve, and when the other pressure predominates to connect the brake cylinder to said sub-atmospheric pressure creating means independently of the brake valve.

3. In a brake system, the combination of a brake cylinder; means for creating sub-atmospheric pressure; a brake valve interposed between said means and said brake cylinder and operable to establish in said cylinder by flow to and from the cylinder a pressure which varies between atmospheric pressure and the sub-atmospheric pressure created by said means; means for throttling flow between said brake valve and said cylinder in both directions; motor means responsive to differentials of the pressures on opposite sides of said throttling means; dual valve means controlled by said motor means and arranged to be closed thereby when said differential is zero, and opened selectively when one pressure predominates to admit atmospheric air to the brake cylinder independently of flow through the brake valve, and when the other pressure predominates to connect the brake cylinder to said sub-atmospheric pressure creating means independently of the brake valve; and yielding means resisting motion of said dual valve means from closed position.

4. In a brake system, the combination of a brake cylinder; means for creating sub-atmospheric pressure; a brake valve interposed between said means and said brake cylinder and operable to establish in said cylinder by flow to and from the cylinder a pressure which varies between atmospheric pressure and the sub-atmospheric pressure created by said means; means for throttling flow between said brake valve and said cylinder in both directions; two diaphragms each subject on its opposite sides to the pressures on opposite sides of said throttling means; and valves, each controlled by a corresponding diaphragm, one opened by its diaphragm during flow from the brake valve to the cylinder to admit atmospheric air to the cylinder independently of flow through the brake valve, and the other opened by its diaphragm upon flow from the brake cylinder to the brake valve, to connect the brake cylinder to the sub-atmospheric pressure producing means independently of the brake valve.

5. In a brake system, the combination of a brake cylinder; means for creating sub-atmospheric pressure; a brake valve interposed between said means and cylinder and having an atmospheric port, said valve being of the type which automatically moves to lap position in response to brake cylinder pressure; means for throttling flow between said brake valve and said cylinder in both directions; motor means responsive to differentials of the pressures on opposite sides of said throttling means; and dual valve means controlled by said motor means and arranged to be closed thereby when said differential is zero, and opened selectively when one pressure predominates to admit atmospheric air to the brake cylinder, independently of flow through the brake valve, and when the other pressure predominates to connect the brake cylinder to said sub-atmospheric pressure creating means independently of the brake valve.

6. In a brake system, the combination of a brake cylinder; means for creating sub-atmospheric pressure; a brake valve interposed between said means and cylinder and having an atmospheric port, said valve being of the type which automatically moves to lap position in response to brake cylinder pressure; means for throttling flow between said brake valve and said cylinder in both directions; motor means responsive to differentials of the pressures on opposite sides of said throttling means; dual valve means controlled by said motor means and arranged to be closed thereby when said differential is zero, and opened selectively when one pressure predominates to admit atmospheric air to the brake cylinder independently of flow through the brake valve, and when the other pressure predominates to connect the brake cylinder to said sub-atmospheric pressure creating means independently of the brake valve; and yielding means resisting motion of said dual valve means from closed position.

7. In a brake system, the combination of a double-acting brake cylinder; means for establishing a sub-atmospheric pressure; a connection from said means to one end of said brake cylinder; a brake valve interposed between said means and the other end of the brake cylinder and operable to establish in said other end an opposing pressure which varies between atmospheric pressure and equalization with said sub-atmospheric pressure; means for throttling the flow between said brake valve and cylinder in both directions; and valve means responsive to pressure differentials created by such throttling on opposite sides of the throttling means and serving on throttled flow toward the cylinder to admit atmospheric air to the brake cylinder independently of the brake valve and on throttled flow from the cylinder to connect the two ends of the cylinder.

8. The combination of a double-acting brake cylinder having a piston; a spring urging said piston in brake releasing direction;

means for establishing sub-atmospheric pressure; a connection between said means and one end of said cylinder; a brake valve interposed in a connection from said means to the other end of said cylinder and operable to establish in said other end a pressure which varies according to the adjustment of the brake valve between equalization with the pressure in the first end of the cylinder, and atmospheric pressure; means for throttling flow between the brake valve and said other end of the cylinder; and valve means responsive to pressure differentials created by such throttling on opposite sides of the throttling means and serving on flow toward the cylinder to admit atmospheric air addition to that flowing through the brake valve to apply the brake and on flow from the cylinder to connect the two ends of the cylinders.

9. In a brake system, the combination of a double-acting brake cylinder; means for establishing a sub-atmospheric pressure; a connection from said means to one end of said brake cylinder; a brake valve interposed between said means and the other end of the brake cylinder and operable to establish in said other end an opposing pressure which varies between atmospheric pressure and equalization with said sub-atmospheric pressure; a constriction in the communication between said brake valve and brake cylinder; motor means responsive to differentials of the pressures on opposite sides of said constriction; and dual valve means controlled by said motor means and arranged to be closed thereby when said differential is zero, and opened selectively when one pressure predominates to admit atmospheric air to the brake cylinder independently of flow through the brake valve, and when the other pressure predominates to connect the two ends of the brake cylinder.

10. In a brake system, the combination of a double-acting brake cylinder; means for establishing a sub-atmospheric pressure; a connection from said means to one end of said brake cylinder; a brake valve interposed between said means and the other end of the brake cylinder and operable to establish in said other end an opposing pressure which varies between atmospheric pressure and equalization with said sub-atmospheric pressure; a constriction in the communication between said brake valve and brake cylinder; motor means responsive to differentials of the pressures on opposite sides of said constriction; dual valve means controlled by said motor means and arranged to be closed thereby when said differential is zero, and opened selectively when one pressure predominates to admit atmospheric air to the brake cylinder independently of flow through the brake valves, and when the other pressure predominates to connect the two ends of the brake cylinder; and yielding means resisting motion of said dual valve means from closed position.

11. a brake system, the combination of a double-acting brake cylinder; means for establishing a sub-atmospheric pressure; a connection from said means to one end of said brake cylinder; a brake valve interposed between said means and the other end of the brake cylinder and operable to establish in said other end an opposing pressure which varies between atmospheric pressure and equalization with said sub-atmospheric pressure; a constriction in the communication between said brake valve and brake cylinder; a pair of diaphragms each subject on opposite sides to the pressures on opposite sides of said constriction; and a pair of valves, the first opened by one diaphragm upon flow from the brake valve to the cylinder, and serving to admit atmospheric air to the brake cylinder, and the other opened upon flow from the cylinder to the brake valve and serving to establish an equalizing communication between the two ends of the cylinder.

12. The combination of a double-acting brake cylinder having a piston; a spring urging said piston in brake releasing direction; means for establishing sub-atmospheric pressure; a connection between said means and one end of said cylinder; a brake valve interposed in a connection from said means to the other end of said cylinder and operable to establish in said other end a pressure which varies according to the adjustment of the brake valve between equalization with the pressure in the first end of the cylinder, and atmospheric pressure; a constriction in the communication between said brake valve and brake cylinder; a pair of diaphragms each subject on opposite sides to the pressures on opposite sides of said constriction; and a pair of valves, the first opened by one diaphragm upon flow from the brake valve to the cylinder and serving to admit atmospheric air to the brake cylinder, and the other opened upon flow from the cylinder to the brake valve and serving to establish an equalizing communication between the two ends of the cylinder.

In testimony whereof I have signed my name to this specification.

CHARLES A. CAMPBELL.